(12) United States Patent
Cook et al.

(10) Patent No.: US 9,532,502 B2
(45) Date of Patent: Jan. 3, 2017

(54) LOW PROFILE SICKLE DRIVE

(75) Inventors: Joel T. Cook, Lititz, PA (US); Ryan T. Gahres, Richland, PA (US); Gary L. Bich, New Holland, PA (US); David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 448 days.

(21) Appl. No.: 14/127,412

(22) PCT Filed: May 25, 2012

(86) PCT No.: PCT/US2012/039739
§ 371 (c)(1),
(2), (4) Date: Jun. 30, 2014

(87) PCT Pub. No.: WO2012/166672
PCT Pub. Date: Dec. 6, 2012

(65) Prior Publication Data
US 2014/0318094 A1    Oct. 30, 2014

Related U.S. Application Data

(60) Provisional application No. 61/491,081, filed on May 27, 2011.

(51) Int. Cl.
*A01D 34/30* (2006.01)
*A01D 34/14* (2006.01)

(52) U.S. Cl.
CPC .............. *A01D 34/14* (2013.01); *A01D 34/30* (2013.01)

(58) Field of Classification Search
CPC ...... A01D 34/13; A01D 34/02; A01D 34/037; A01D 34/30; F16H 21/00; F16H 21/44
(Continued)

(56) References Cited

U.S. PATENT DOCUMENTS

| 1,511,501 A | 10/1924 | Campbell |
| 2,942,483 A * | 6/1960 | Thomas ................. F16F 15/22 56/296 |

(Continued)

FOREIGN PATENT DOCUMENTS

| DE | 4319409 A1 | 3/1994 | |
| DE | 19524039 A1 * | 1/1997 | ............. A01D 34/30 |

(Continued)

*Primary Examiner* — John G Weiss
(74) *Attorney, Agent, or Firm* — Peter K. Zacharias; Patrick M. Sheldrake

(57) ABSTRACT

A sickle drive incorporated into a generally flat package or enclosure or floor. The drive includes an epicyclic mechanism, including a rotatable input element in an upper region of a cavity of the enclosure, and an eccentric element below the input element rotatable eccentrically thereby. A drive arm is connected to the eccentric element for rotation about, and eccentric rotation with, the eccentric element, and extends to a pivot element which can be the only component extending upwardly from the enclosure or floor, such that the shaft will be pivoted by the eccentric movement of the drive arm. A knife arm connects to the pivot element and a sickle knife assembly which will be reciprocated by the pivoting action. A second epicyclic arrangement can be employed such that opposite forces generated by operation of the drive will be largely canceled.

20 Claims, 13 Drawing Sheets

(58) Field of Classification Search
USPC .......... 56/158, 296, 12.6, 17.6, 297; 74/595, 74/22 A, 25, 55
See application file for complete search history.

(56) References Cited

U.S. PATENT DOCUMENTS

| | | | |
|---|---|---|---|
| 3,499,271 A | | 3/1970 | Drigert et al. |
| 3,517,494 A | * | 6/1970 | Beusink ................ A01D 34/30 56/293 |
| 3,701,238 A | | 10/1972 | Hintze, Jr. |
| 3,973,378 A | | 8/1976 | Bartasevich et al. |
| 4,866,921 A | | 9/1989 | Nagashima et al. |
| 4,909,025 A | | 3/1990 | Reissig et al. |
| 5,189,867 A | | 3/1993 | Schmidt |
| 5,497,605 A | | 3/1996 | Underwood et al. |
| 6,314,707 B1 | | 11/2001 | Ryan |
| 6,889,492 B1 | | 5/2005 | Polk et al. |
| 7,140,961 B2 | | 11/2006 | Visagie et al. |
| 7,401,458 B2 | | 7/2008 | Priepke |
| 7,520,118 B1 | | 4/2009 | Priepke |
| 7,730,709 B2 | | 6/2010 | Priepke |
| 7,805,919 B2 | | 10/2010 | Priepke |
| 7,810,304 B2 | | 10/2010 | Priepke |
| 8,011,272 B1 | | 9/2011 | Bich et al. |
| 8,151,547 B2 | | 4/2012 | Bich et al. |
| 2011/0099964 A1 | * | 5/2011 | Coers ..................... A01D 34/30 56/296 |

FOREIGN PATENT DOCUMENTS

| | | |
|---|---|---|
| GB | 1222774 A | 2/1971 |
| GB | 2166033 | 4/1986 |
| RU | 2032306 C1 | 4/1995 |
| SU | 1496683 A1 | 7/1989 |
| SU | 1516042 A1 | 10/1989 |

* cited by examiner

LOW PROFILE SICKLE DRIVE

This application is the US National Stage for International Application No. PCT PCT/US12/39739, filed on May 25, 2012, which itself is related to and claims the benefit of U.S. Provisional Application No. 61/491,018 filed May 27, 2011.

TECHNICAL FIELD

This invention relates generally to a drive for the sickle of a header of an agricultural cutting machine, such as a combine, windrower or other crop harvesting machine, or a mower, and more particularly, to a drive mechanism having only a pivotally rotating drive shaft extending upwardly from an upper enclosure thereof for connection to a knife head, and which is configured to have a profile shape when viewed from the side that tapers convergingly toward a forward end thereof, so as to be adapted to be disposed in or below a floor or pan of the header, to reduce interference with plant material flow.

BACKGROUND ART

The disclosure of U.S. Provisional Application No. 61/491,018, filed May 27, 2011, is hereby incorporated herein in its entirety by reference.

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

The knife assembly is driven reciprocatingly longitudinally by an oscillating drive, which can include, but is not limited to, an eccentric shaft on a rotating hub, a wobble drive, or a similar well known commercially available device. Such drives are typically located at the sides of the header, so as to drive the knife assembly from the end. This location is advantageous as it allows the driving point for the knife assembly to be in line with the stationary bar, provides clearances for removal of the knife assembly, and provides space for assembly of the drive. Disadvantages of the side location include that the header must include significant frame structure for supporting the drive and to withstand forces and vibrations generated thereby. The end structure or crop divider at the end of the header must also be relatively wide, to accommodate the drive and to direct adjacent standing crops therepast, and increasing the possibility of accidentally pushing down adjacent standing crops. Additionally, for headers utilizing two drives located on opposite sides of the header, it is usually desired to time the operation of the drives such that the forces and vibrations generated by the respective drives cancel one another. This typically involves relatively long mechanical drive lines connecting the two drives together, which is disadvantageous as it adds weight, cost and complexity.

A knife assembly, which will weigh from 35 to 38 pounds for a typical 20 foot wide header, typically must accelerate and decelerate two times per cycle as a result of the reciprocating movement. A typical speed for the knife assembly is up to about 16 hertz or cycles per second. Thus, it can be seen, the reciprocating motion at a high cycle per second generates high acceleration values and high deceleration values that in turn generate high forces on the structural components. These high forces can have at least two negative effects, vibration at the drive system that may be transmitted to other components of the machine, and fatigue failure of the structural components themselves. On larger headers, for instance, headers 30 feet wide and greater, two knife assemblies each equal to one-half the sideward extent of the header are often used.

Driving a knife assembly or assemblies of a header from a more central location, such as the center of the header, would provide several advantages compared to a side location. Notably among these advantages, the header structure would not be required to support heavy drive units on one or both sides, such that the structure of the header could be lighter. Long timing apparatus extending between the ends could also be eliminated. If the drive mechanism could be incorporated into a location that would not interrupt or require dividing crop or plant material flow through the crop flow area of the header, the normal crop flow of the header would not be significantly impacted. And, since the drives are not located in the ends, the end dividers can be made significantly thinner, such that the header can have a shorter overall width, would be more easily maneuverable in relation to adjacent standing crop, and danger of downing the adjacent standing crop would be reduced.

Reference Priepke U.S. Pat. Nos. 7,810,304; 7,805,919; 7,730,709; 7,520,118; and 7,401,458, and Bich et al., U.S. Pat. No. 8,011,272, which demonstrate that a sickle drive or drives can be incorporated in or below the header floor to solve one or more of the problems set forth above in regard to end mounted drives and interruption of plant material flow in the crop flow area of the header.

What is sought is a sickle drive adapted to be incorporated into or below the floor of a header of a plant cutting or harvester to reduce interruption and splitting of plant material flow, and which overcomes one or more of the shortcomings and limitations set forth above.

SUMMARY OF THE INVENTION

What is disclosed is a sickle drive adapted to be incorporated into or below the floor of a header of a plant cutting or harvester to reduce interruption and splitting of plant material flow, and which overcomes one or more of the shortcomings and limitations set forth above.

According to a preferred aspect of the invention, the drive includes a generally flat enclosure having a forward end and bounding and defining a cavity. The drive is preferably configured as an epicyclic arrangement, including a rotatable first input element supported in the cavity for rotation about a generally upstanding first rotational axis. The drive includes a first eccentric element supported in the cavity for rotation by the first input element in eccentric relation to the rotational axis. The drive includes a first drive arm disposed preferably at least partially in the cavity and having a first end and a second end opposite the first end, the first end being connected to the eccentric element for rotation about a first eccentric axis therethrough eccentrically about the first rotational axis. The first drive arm preferably extends in a first sideward direction from the first end relative to the first rotational axis to the second end, and the second end pivotally connects eccentrically to a first pivot element supported for rotation about a generally upstanding first pivotal axis, such that, in operation, the first pivot element will be pivoted about the first pivotal axis by the rotation of the first end of the first drive arm about the first rotational axis. The pivot element is configured for connection or mounting of a knife arm thereto, for connecting to a first sickle knife assembly extending forwardly thereof, such that operation of the drive will reciprocatingly move the first sickle knife assembly sidewardly relative to the enclosure.

According to another preferred aspect of the invention, the input element, eccentric element and the drive arm are each relatively flat, and the latter two are substantially vertically coextensive, for vertical compactness, such that the drive is adapted to be unobtrusively positioned below or in the front region of the floor of a header, to allow relatively unhindered plant material flow thereover.

According to still another preferred aspect of the invention, the drive includes a rotatable second input element supported in the cavity for rotation about a generally upstanding second rotational axis, preferably in side by side relation to the first input element. The drive includes a second eccentric element supported in the cavity for rotation by the second input element in eccentric relation to the second rotational axis. The drive includes a second drive arm preferably at least partially disposed in the cavity and having a first end and a second end opposite the first end thereof, the first end of the second drive arm being connected to the second eccentric element for rotation about a second eccentric axis therethrough and eccentrically therewith about the second rotational axis, the second drive arm extending in a second sideward direction opposite the first sideward direction from the first end thereof to the second end thereof. The second end of the second drive arm pivotally connects eccentrically to a second pivot element supported for rotation about a generally upstanding second pivotal axis, such that the second pivot element will be pivoted about the second pivotal axis by the rotation of the first end of the second drive arm about the second rotational axis. A second knife arm is preferably connected to or mounted on the second pivot element and is configured for connecting to a second sickle knife assembly extending forwardly thereof, for reciprocatingly moving the second sickle knife assembly sidewardly relative to the enclosure.

As another preferred aspect of the invention, the first drive arm extends sidewardly across and forwardly of the second input element, and the second drive arm extends sidewardly across and rearwardly of the first input element. Alternatively, the drive arms of each of the drives can extend in opposite sideward directions, that is, away from the other of the drives, so that they do not cross. As still another variation, the drives can be configured such that the drive arms extend more forward and rearward, as opposed to sidewardly.

As still another preferred aspect of the invention, the first input element and the second input element are connected together for joint rotation in opposite rotational directions, for reciprocatingly moving the first and second sickle knife assemblies sidewardly simultaneously in opposite directions. This is advantageous as opposite forces generated by the operation of the drive will at least largely cancel each other. As a further preferred aspect of the invention, a rotatable power source or input is connected in rotatably driving relation to either the first input element or the second input element, for jointly driving them in the opposite directions. The power source can comprise, for instance, a fluid or electric motor, drive shaft, belt drive, chain drive, or the like.

The enclosure can fully contain the drive or drives, for instance, by including full upper and lower covers, or it can partially enclose the drive or drives, such that all or a portion of any of the elements are exposed. For instance, as a non-limiting example, the enclosure can include or be incorporated in or below the floor of a header of a plant cutting machine which will serve as a cover, with all or a portion of a bottom region of the drive or drives, or elements thereof, exposed to the ground below, essentially the frame of the header then generally defining the lower bounds of the cavity.

As an advantage of the invention, the long drive arms have been found to provide a smoother cyclical cutting action for the sickle knives, close to a pure sinusoidal motion. And by crossing the drive arms, a more compact package is achieved.

DETAILED DESCRIPTION OF THE INVENTION

Figure 1:
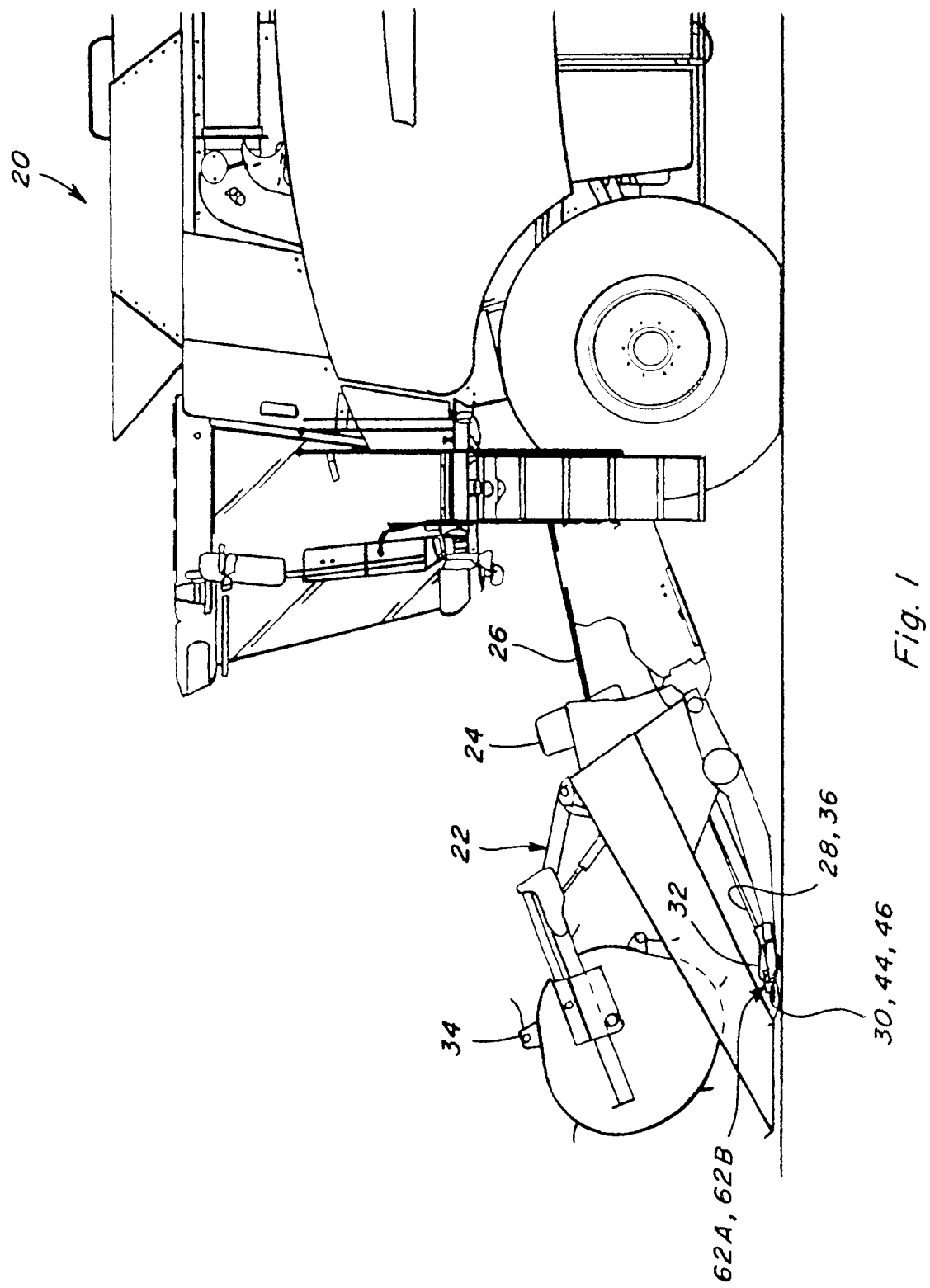
FIG. 1 is a fragmentary side view of a harvester including a header having low profile sickle drives according to the invention.
Figure 2:
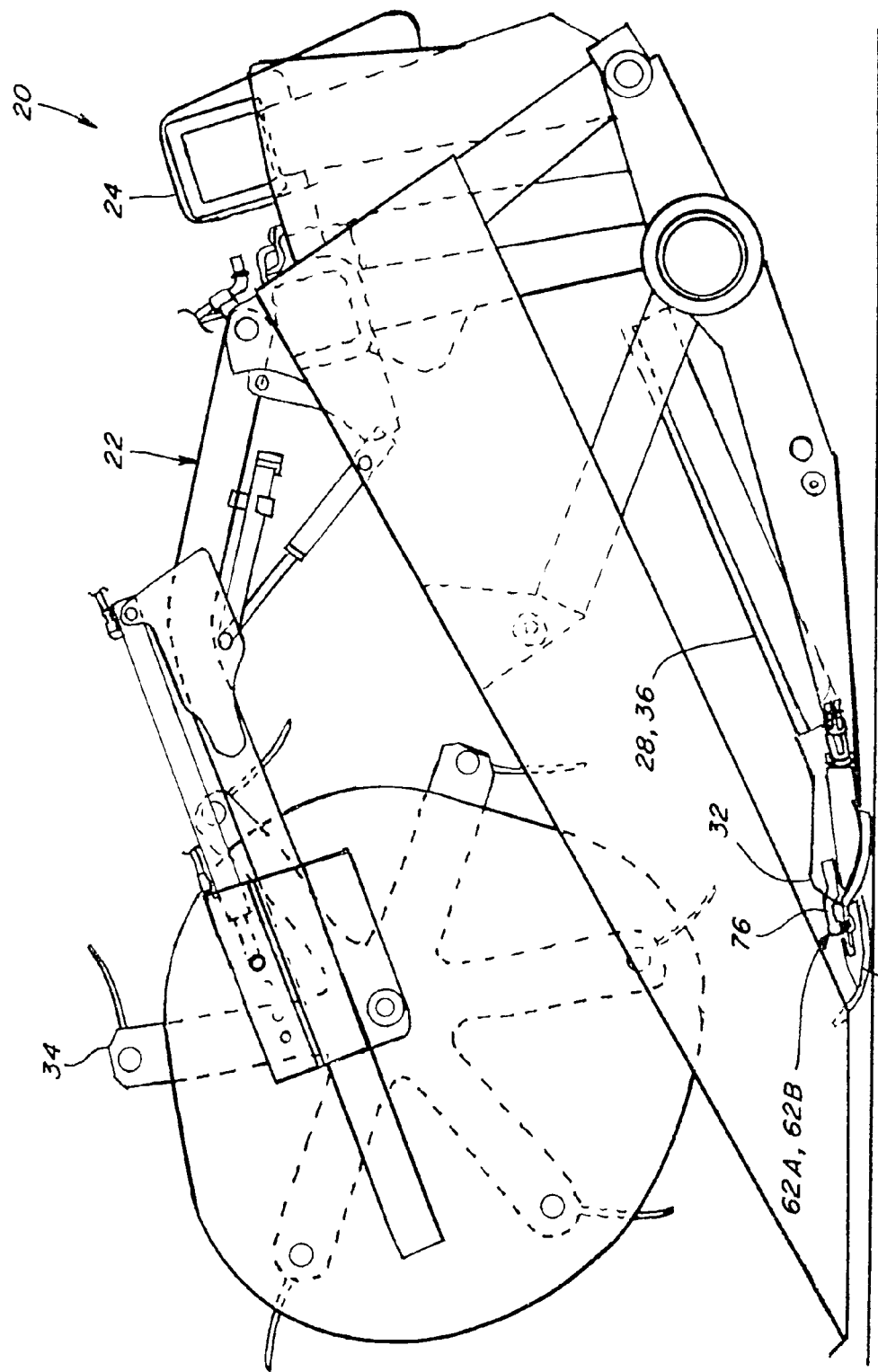
FIG. 2 is an enlarged fragmentary side view of the header and sickle drives of the invention.

Turning now to the drawings wherein a preferred embodiment of the invention is shown, in FIGS. 1 through 5, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Figure 3:
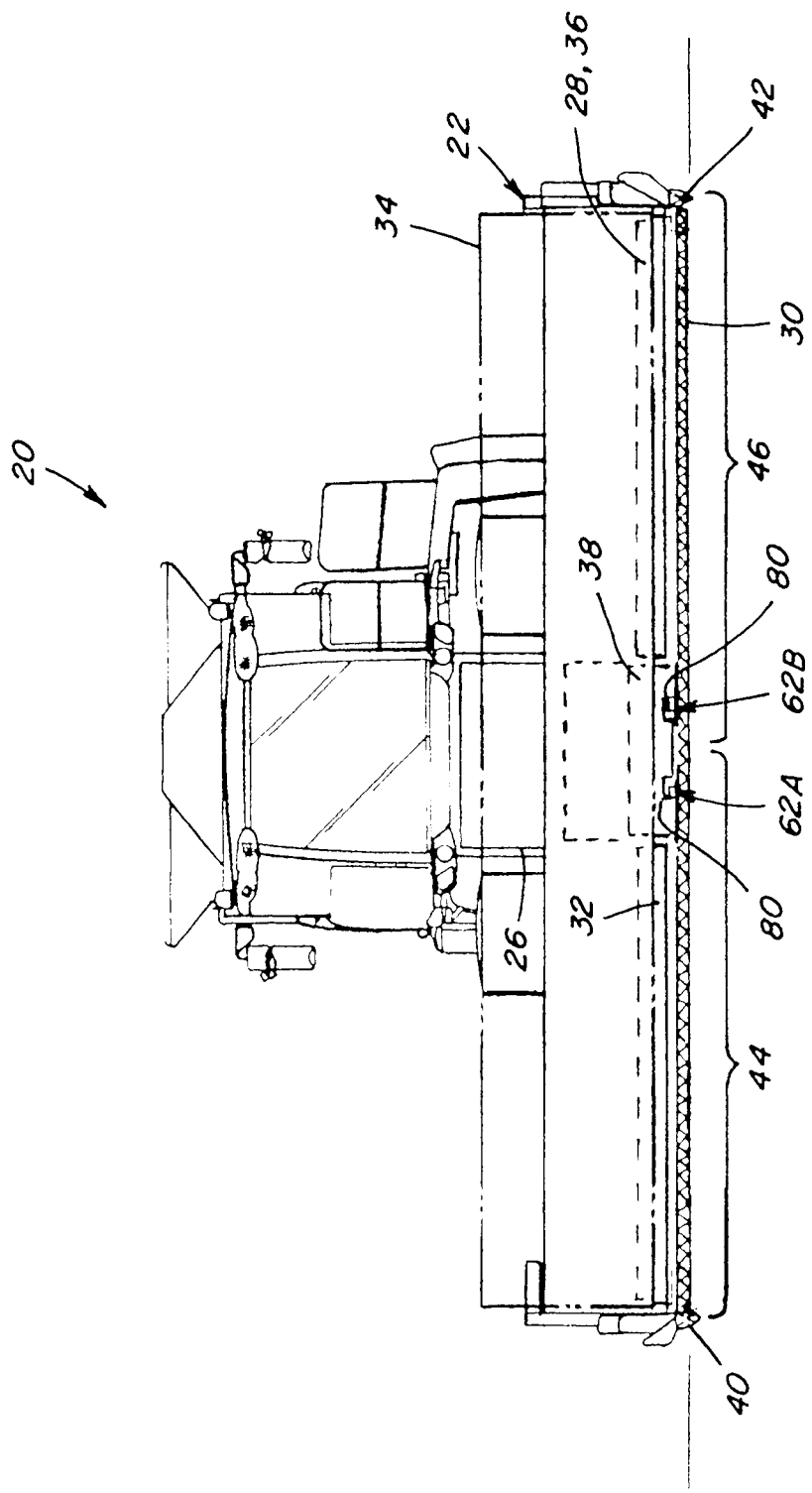
FIG. 3 is a front view of the harvester and header, showing the location of the sickle drives.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 4:
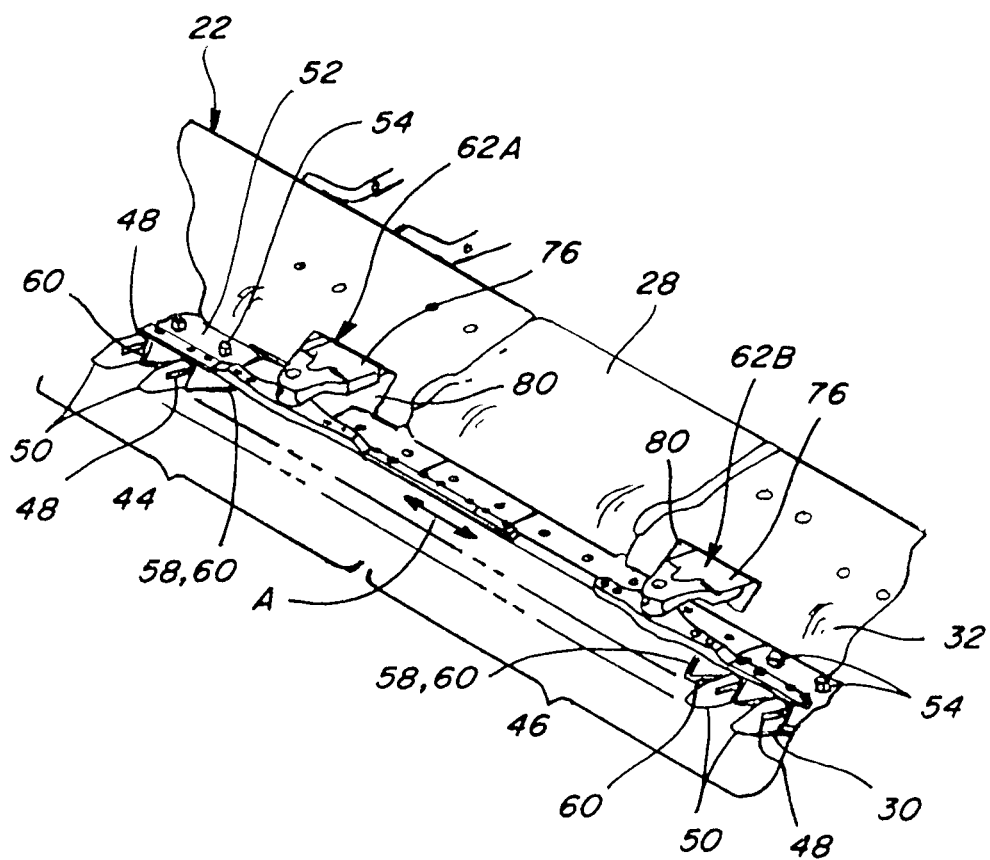
FIG. 4 is a fragmentary perspective view of the header, showing aspects of the sickle drives.
Figure 5:
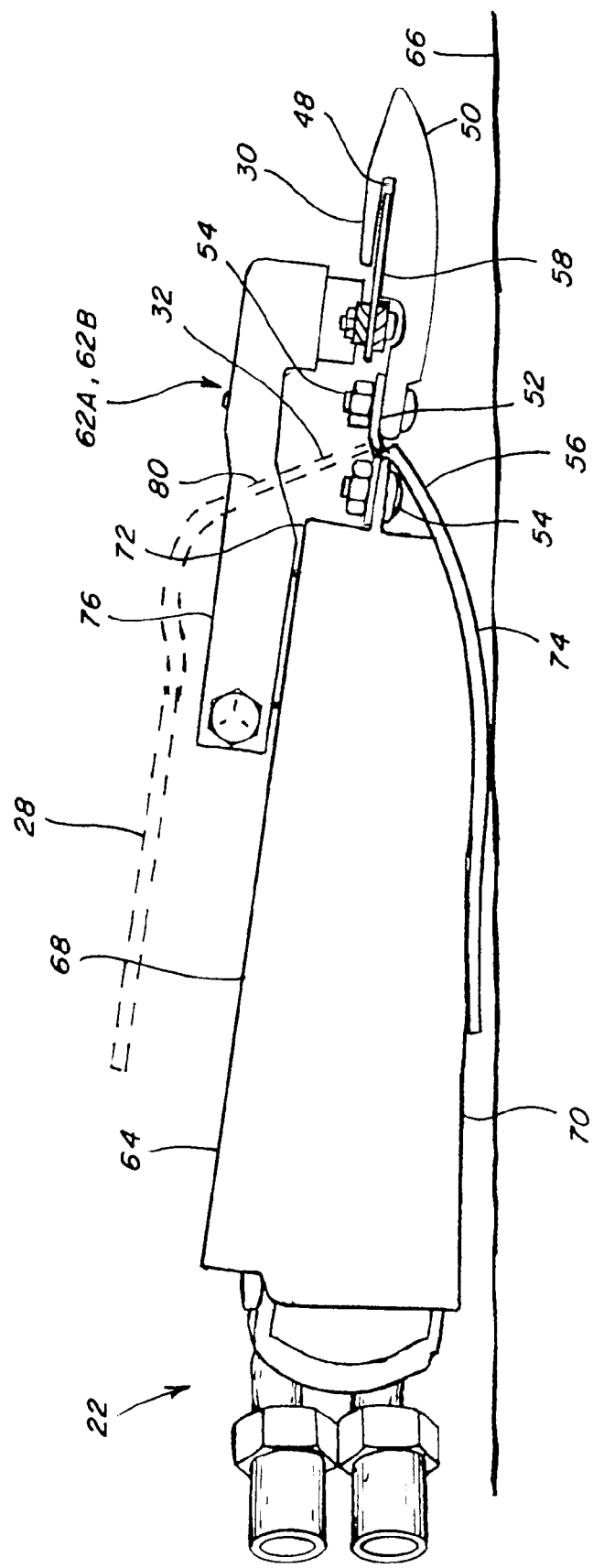
FIG. 5 is an enlarged side view showing aspects of the header, drives, and sickle.

Referring more particularly to FIGS. 4 and 5, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54, as best illustrated in FIG. 5. Each of cutter bar assemblies 44 and 46 supports an elongate knife assembly 58 for reciprocating longitudinal movement within slots 48, each knife assembly 58 including a row of knife sections including oppositely facing, angularly related knife edges 60 which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

As noted above under the Background Art heading, it is desirable to reduce negative effects of the reciprocating sideward motion of knife assemblies 58, including, but not limited to, vibration, fatigue failure, and the like, and also the disadvantages of known structures for effecting the motion, including the need for substantial structure for supporting drive mechanisms on the sides of headers, the increased width of side dividers containing the mechanism, and apparatus for timing drive mechanisms located on opposite sides of a header.

Reduction of these negative effects and disadvantages is achieved according to the present invention by utilizing first and second low profile sickle drives 62A and 62B constructed and operable according to the teachings of the present invention, for reciprocatingly driving the respective knife assemblies 58. First and second sickle drives 62A and 62B are illustrated in FIGS. 3 and 4 at a center location on header 22 between side edge portions 40 and 42, although it should be noted that it is contemplated that sickle drives 62A and 62B could alternatively be utilized at other locations on a header, and that multiple sickle drives 62 could be used at multiple locations on a header.

First and second sickle drives 62A and 62B are packaged together in a low profile common enclosure 64. Enclosure 64 is configured so as to be integrated into or beneath floor 28 of header 22, in, or just rearward of, forward edge portion 32, as best shown in FIG. 5, to facilitate both smooth flow of crop or plant material thereover, and also smooth passage over the ground surface 66 therebelow. In this latter capacity, it can be observed that enclosure 64 is desirably configured to have a tapered profile shape when viewed from the side, preferably including an upper cover 68, and a lower cover 70 to allow disassembly, and which extend generally convergingly toward a forward end 72 of the enclosure. Also preferably, the forward end of lower cover 70 will have an upwardly curving shape, to guide and facilitate the smooth passage over the ground surface and flow of plant material thereabout. It can be observed that forward edge portion 32 of floor 28 has an upwardly curved shape, which combined with the upwardly tapered or curved forward end of enclosure 64, provides header 22 with an overall wedge shaped leading edge profile, which again, facilitates the smooth flow over the ground and of plant material over the front edge of the header. Enclosure 64 can be mounted in any suitable manner, such as by attachment with fasteners to frame or structural elements of header 22.

As shown, upper cover 68 of enclosure 64 is located below forward edge portion 32 of floor 28, which can comprise sheet metal or other suitable material, such that cut plant material will flow over the enclosure without contacting it. Alternatively, upper cover 68 can be integrated into floor 28. Enclosure 64 will be of cast and/or machined metal construction such as steel or aluminum, and upper and lower covers 68 and 70 can be joined together with suitable fasteners, as illustrated in subsequent figures. A skid plate 74 can be disposed below at least the forward end, for protection from wear and contact with hard objects such as rocks and the like that may be encountered during operation.

Each of first and second sickle drives 62A and 62B includes a knife arm 76 atop upper surface 68 of enclosure 64 and extending forwardly therefrom. Knife arms 76 pivotally connect to the knife assemblies 58, respectively, and are movable by the respective drive 62A or 62B in a sideward pivoting action that will translate via a pivoting relationship into the above described sideward reciprocating movement, as restrained by the guards 50. Knife arms 76 are the only upwardly externally protruding elements of first and second drives 62A and 62B, the other elements being located within an internal cavity 78 of enclosure 64. Knife arms 76 project forwardly through slots 80 in forward edge portion 32, to minimize interruption of the plant material flow.

Referring also to FIGS. 6, 7, 8, 9, 10, 11, 12 and 13, the internal elements of first and second drives 62A and 62B other than knife arms 76 are disposed in side by side relation in an internal cavity 78 of enclosure 64. First and second drives 62A and 62B are each configured as an epicyclic arrangement, including a central rotatable input element, an eccentric element rotatable along an epicyclical orbit about the rotatable input element, and a pivoting drive arm moved by the eccentric element to pivot the knife arm in the side to side direction. More particularly, first drive 62A includes a rotatable first input element 82 supported in an upper region of cavity 78 for rotation about a generally upstanding first rotational axis 84. Drive 62A includes a first eccentric element 86 supported in cavity 78 below first input element 82 for rotation thereby in eccentric relation to first rotational axis 84 about a generally upstanding first eccentric axis 88 laterally offset relative to rotational axis 84, such that eccentric element 86 will follow an epicyclical path 90 about rotational axis 84. Drive 62A includes a first drive arm 92 disposed in cavity 78, having a first end 94 and an opposite second end 96. First end 94 is rotatably connected to eccentric element 86 for rotation therewith along epicyclical path 90 (FIG. 6) about first rotational axis 84. First drive arm 92 extends in a first sideward direction from first end 94 to second end 96. Second end 96 pivotally connects to a pivot arm 98 connected eccentrically to a pivot shaft 100 of a first pivot element 102 supported for rotation about a generally upstanding first pivotal axis 104 therethrough. Pivot shaft 100 extends upwardly through an aperture 106 through upper cover 68 of enclosure 64 and fixedly connects to a knife arm 76, e.g., via a splined connection or the like.

Figure 13:
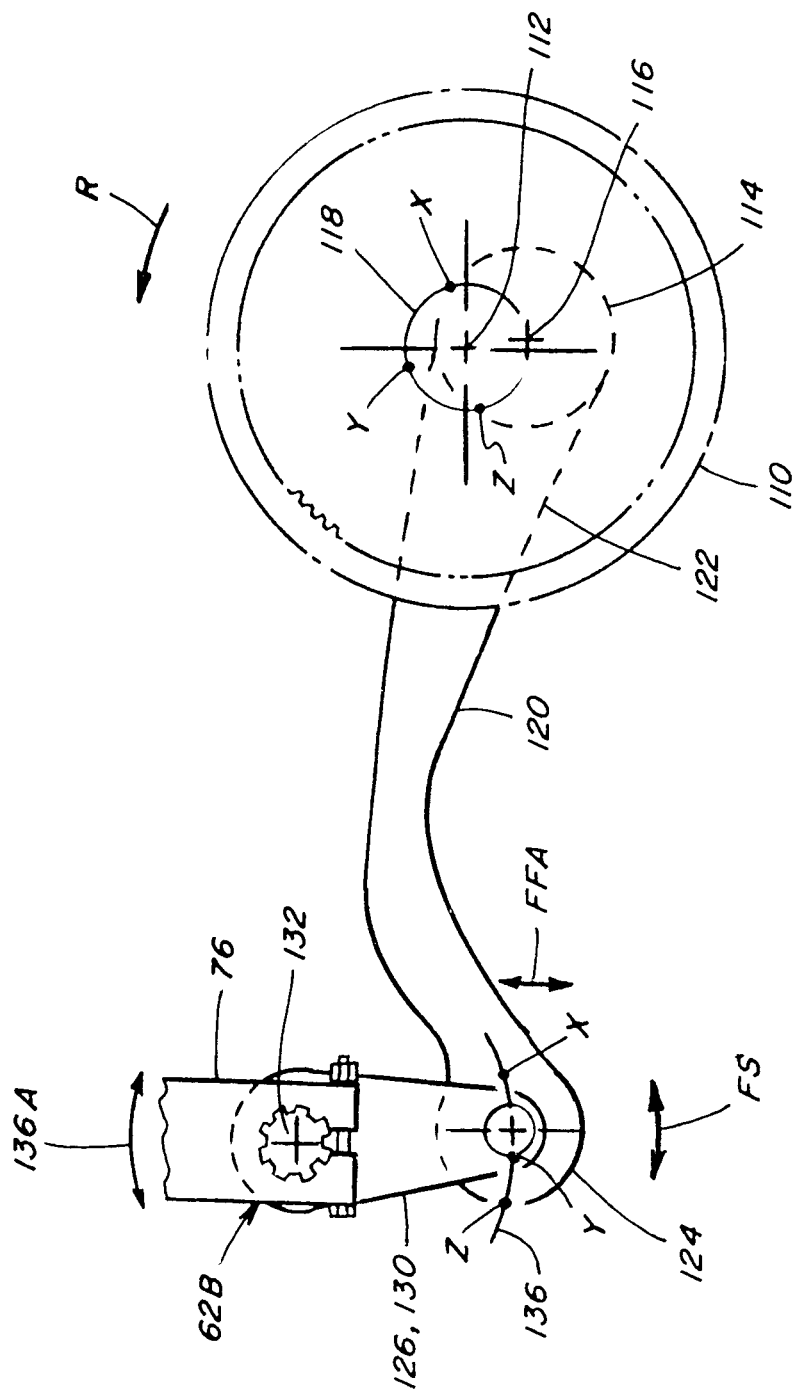
FIG. 13 is a simplified schematic top view of elements of another of the drives to illustrate various drive positions thereof.

In operation, rotation of first input element 82 will cause first eccentric element 86 to orbit eccentrically along epicyclical path 90. First drive arm 92, because it has a fixed length and is attached at one end to first eccentric element 86 and at the other end to pivot arm 98, can only move generally longitudinally, with first end 94 also orbiting along path 90 about rotational axis 84 while also rotating about eccentric axis 88. This, in combination with the ability of pivot arm 98 and pivot shaft 100 of element 102 to only pivot about pivotal axis 104, results in limited pivotal movement of second end 96 of drive arm 92 and pivot arm 98 along an arcuate path about axis 104. Because knife arm 76 is fixedly connected to the upper end of pivot shaft 100, it will be limited in movement to an arcuate path 108A, as shown in FIG. 13. Additionally, because the opposite end of knife arm 76 is connected to a knife assembly 58, knife assembly 58 will be reciprocatingly moved sidewardly an amount A relative to guards 50, to effect the plant cutting action. In this regard, the connection of knife arm 76 to knife assembly 58 is preferably a pinned connection such that knife assembly 58, or that portion thereof in proximity to knife arm 76, will also move along the pivotal path, such that some limited fore and aft movement of the knife assembly will occur, as denoted by distance B in FIG. 13. The relationship between the guards and knife assembly can be configured to allow this. Alternatively, the connection between the knife head and knife assembly can be configured, e.g., slotted connection, to allow some limited fore and aft relative movement, such that the knife assembly only moves sidewardly.

Figure 6:
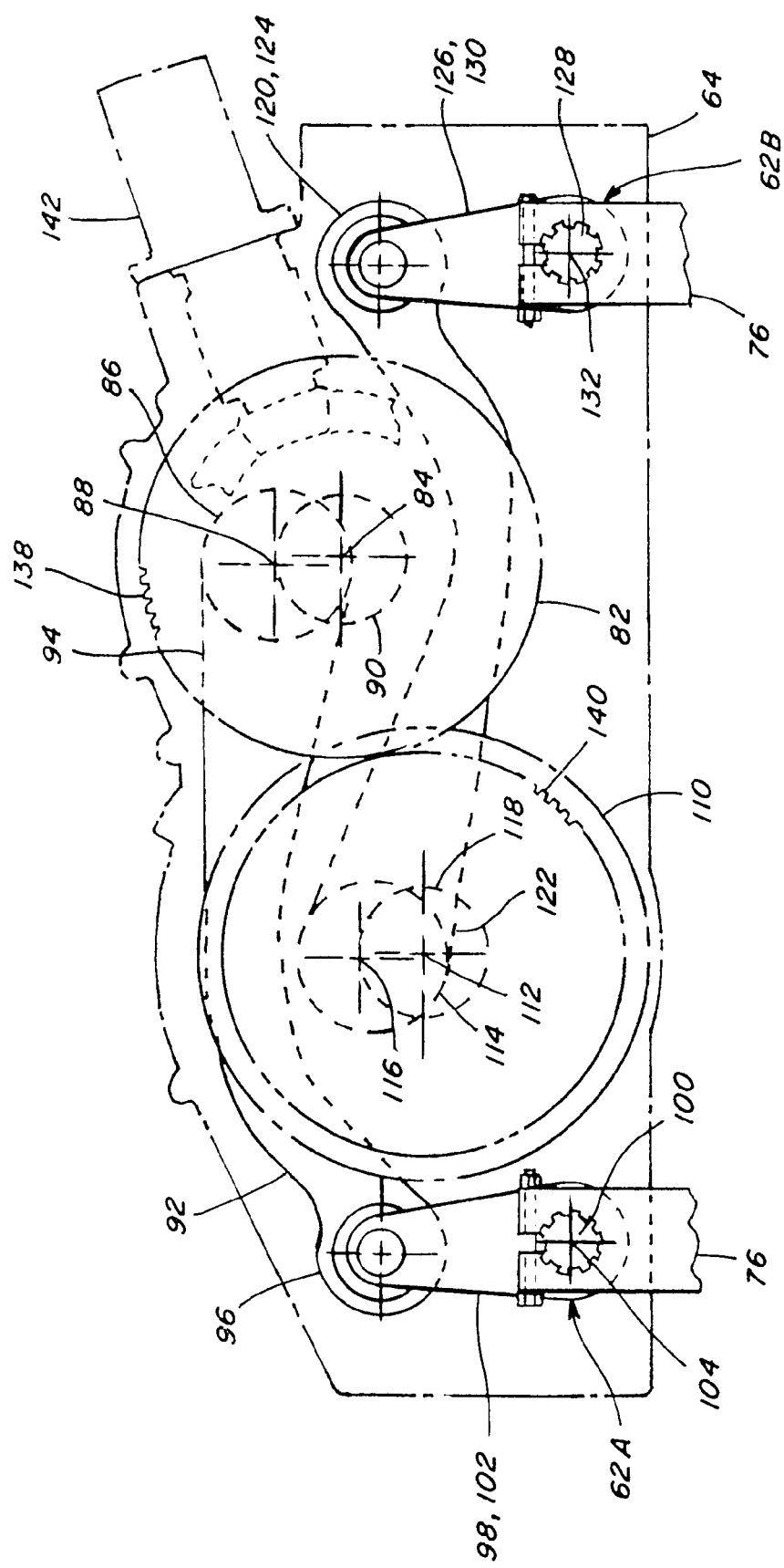
FIG. 6 is a simplified schematic top view of the drives, illustrating internal elements thereof.
Figure 7:
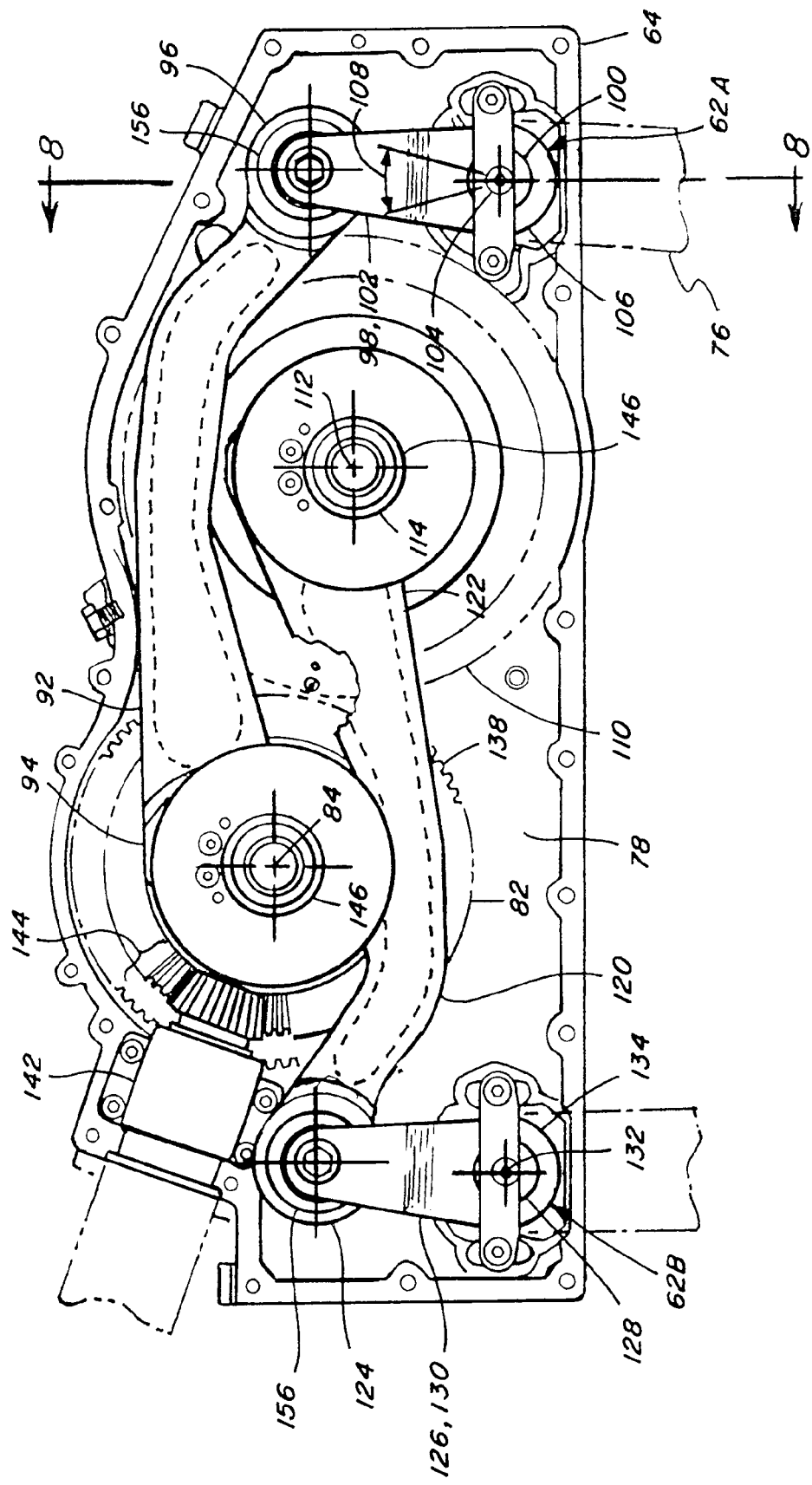
FIG. 7 is a bottom view of the drives with a bottom enclosure cover removed, to show internal elements of the drives.
Figure 8:
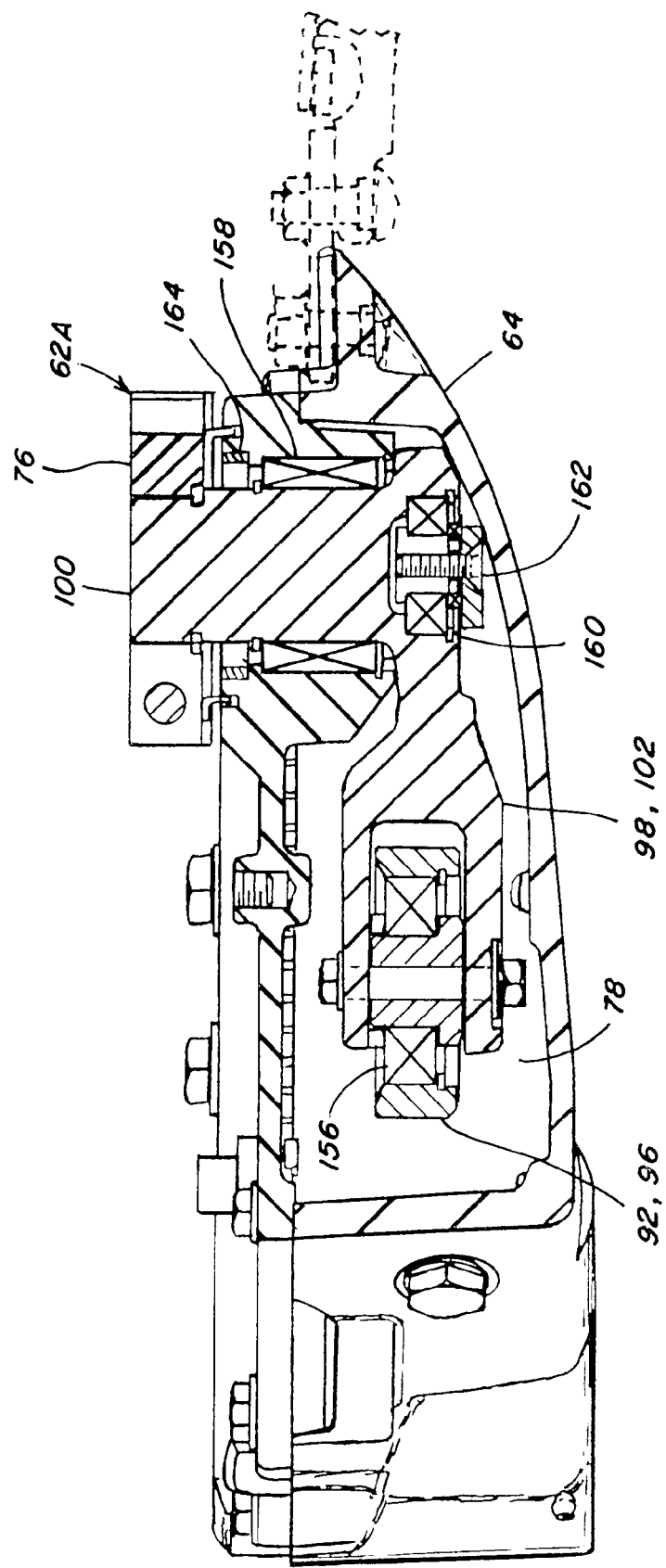
FIG. 8 is a sectional view of one of the drives taken through line 8-8 of FIG. 7.
Figure 9:
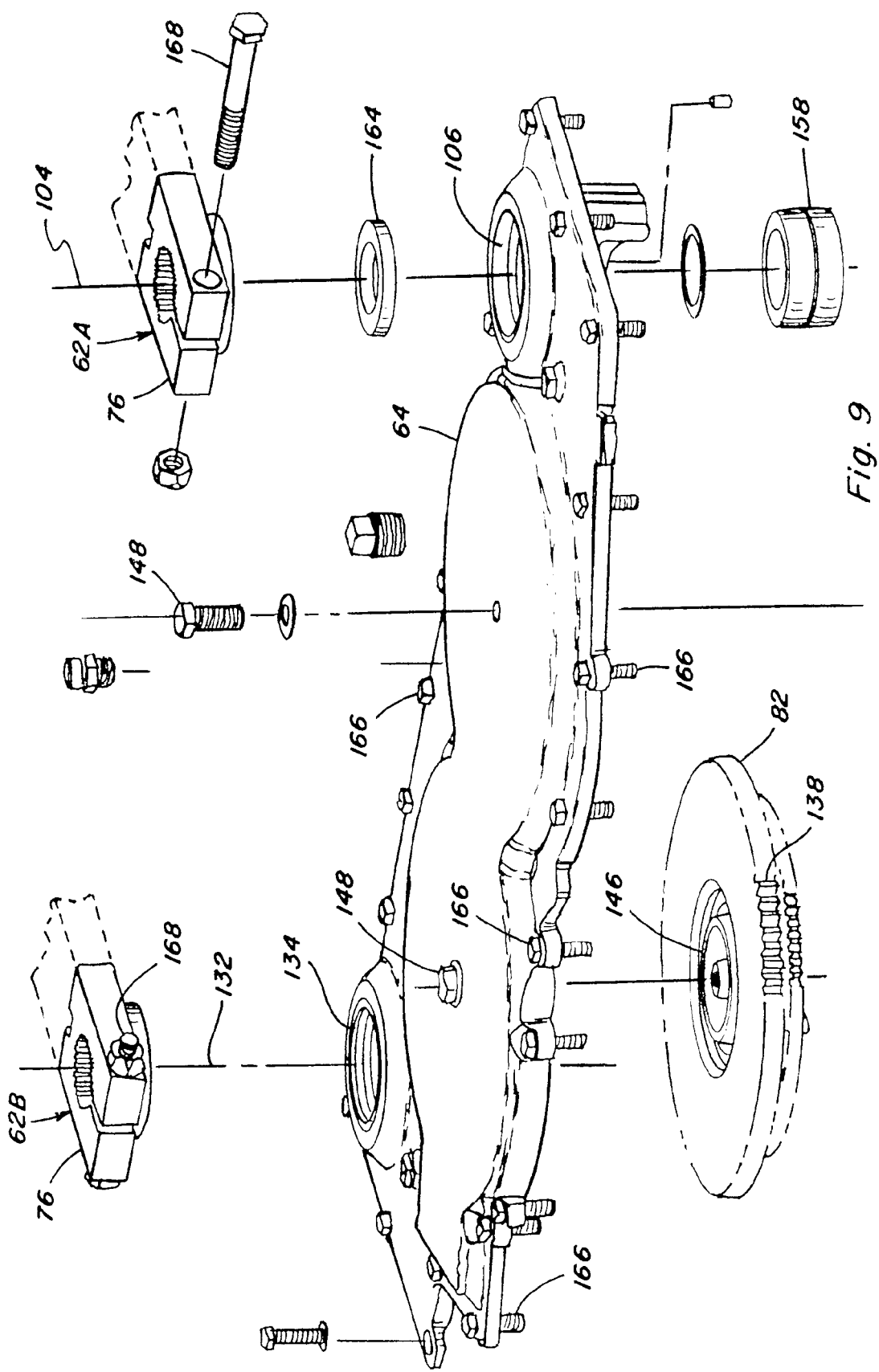
FIG. 9 is a partial exploded view of the drives.
Figure 10:
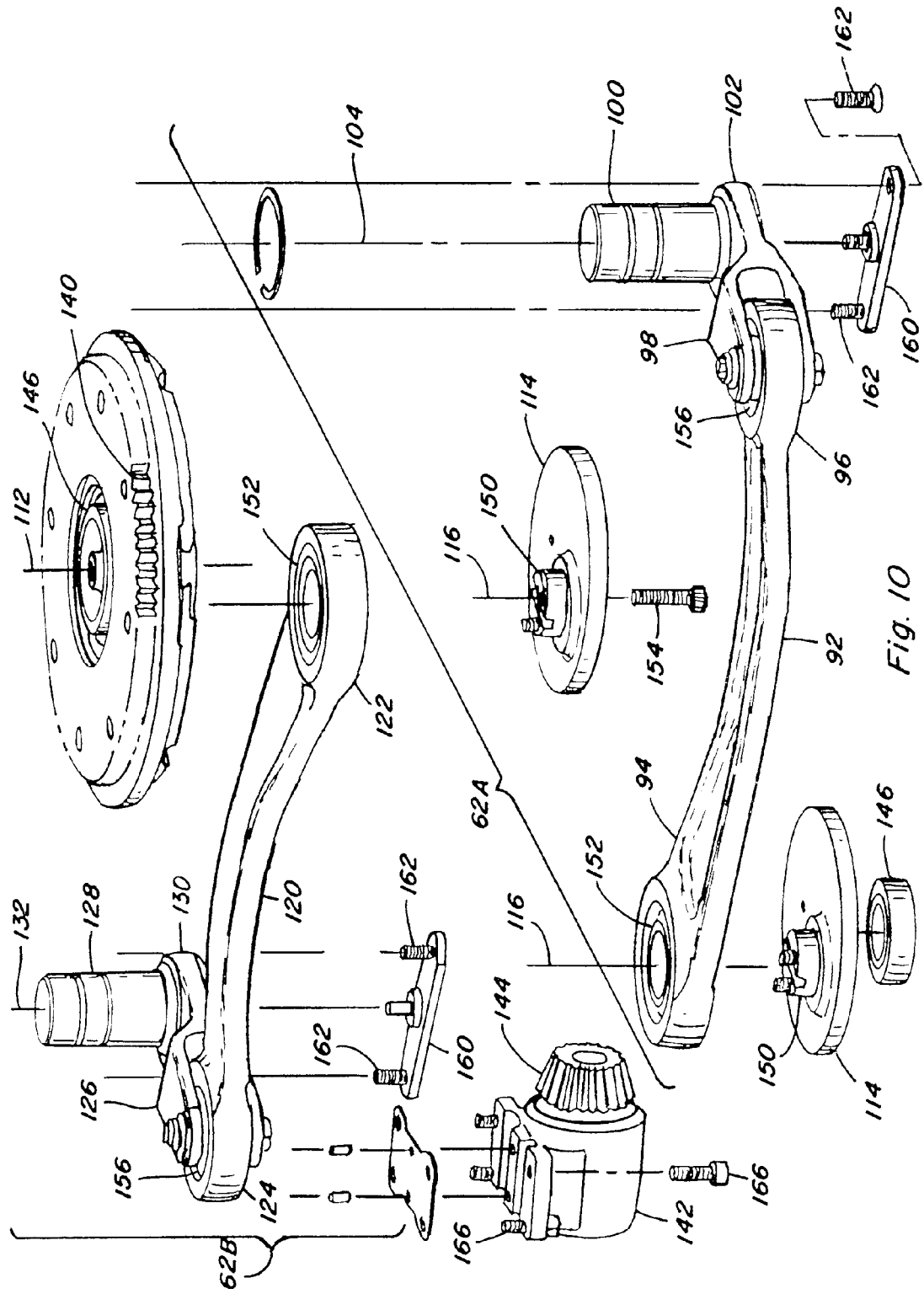
FIG. 10 is another partial exploded view of the drives.
Figure 11:
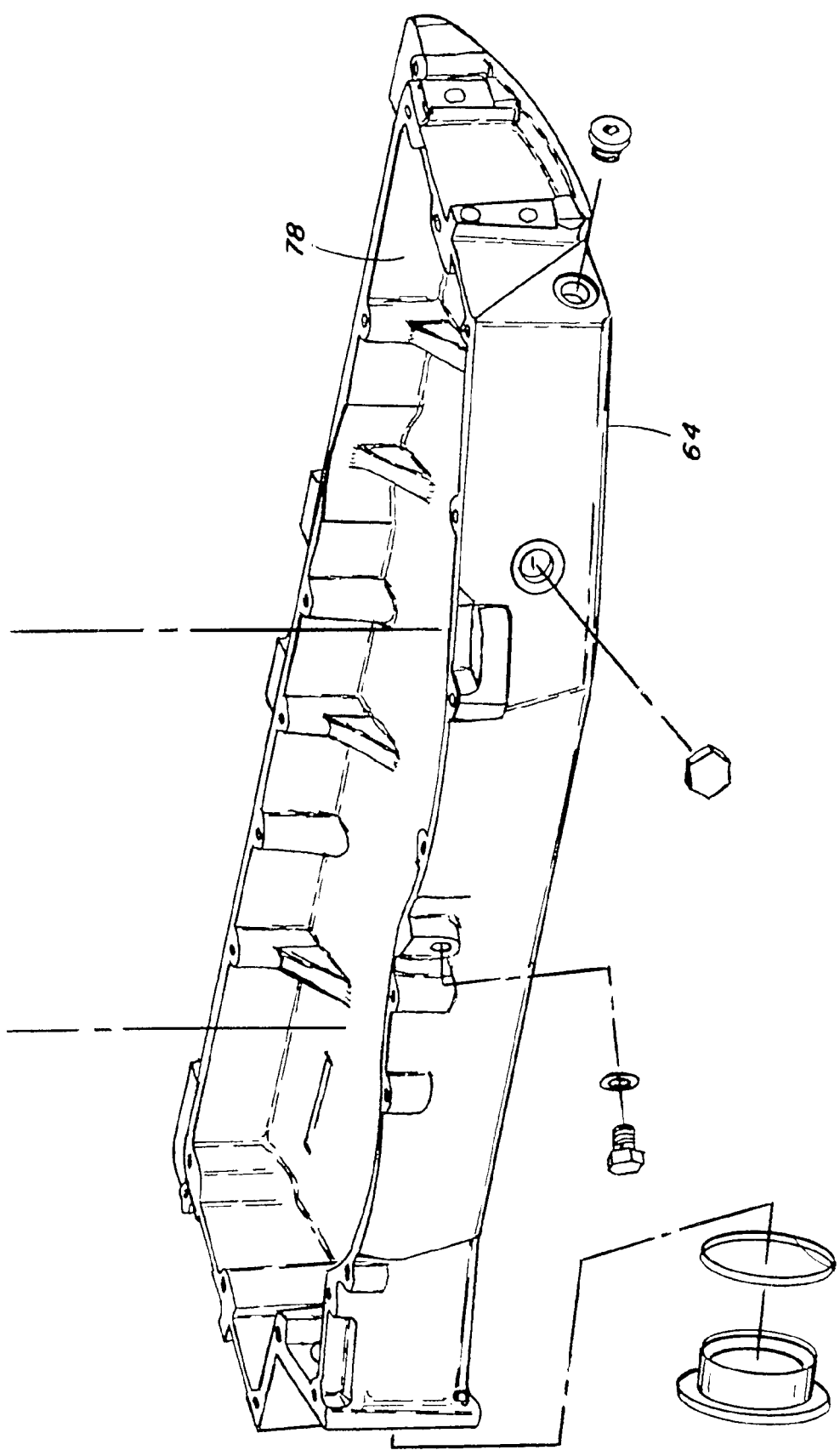
FIG. 11 is still another partial exploded view of the drives.
Figure 12:
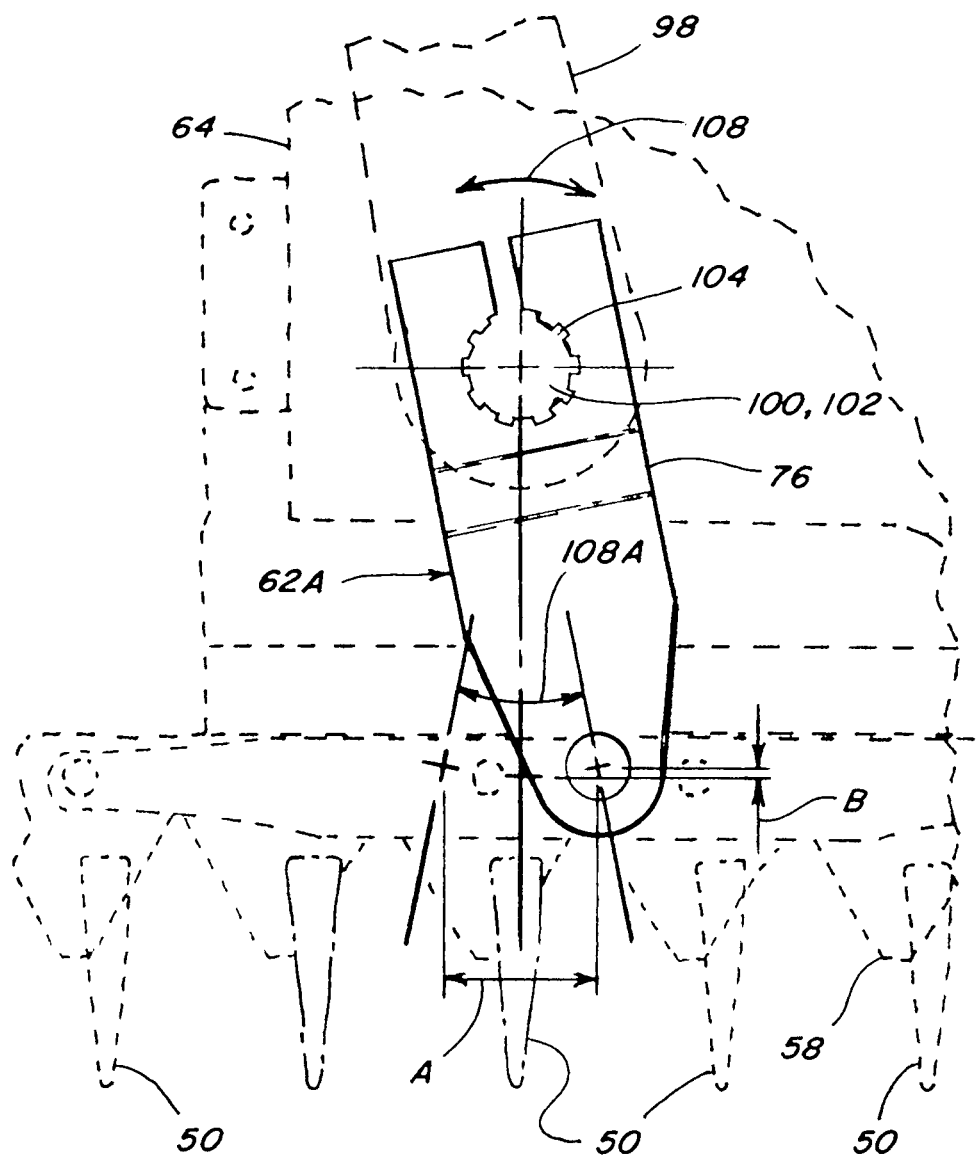
FIG. 12 is a simplified fragmentary schematic top view of elements of one of the drives, illustrating output motions thereof.

Second drive 62B includes a rotatable second input element 110 supported in an upper region of cavity 78 for rotation about a generally upstanding second rotational axis 112, beside first input element 82. Drive 62B includes a second eccentric element 114 supported in cavity 78 below second input element 110 for rotation thereby in eccentric relation to second rotational axis 112 about a generally upstanding second eccentric axis 116 laterally offset relative to rotational axis 112, such that eccentric element 114 will follow an epicyclical orbital path 118 about rotational axis 112, as shown in FIGS. 6 and 13. Drive 62B includes a second drive arm 120 disposed in cavity 78, having a first end 122 and an opposite second end 124. First end 122 is rotatably connected to second eccentric element 114 for rotation therewith about second eccentric axis 116 in eccentric relation to, and about, second rotational axis 112. Second drive arm 120 extends in a second sideward direction opposite the first sideward direction from first end 122 relative to second rotational axis 112 to second end 124. Second end 124 pivotally connects to a pivot arm 126 connected eccentrically to a pivot shaft 128 of a second pivot element 130 supported for rotation about a generally upstanding second pivotal axis 132 therethrough. Pivot shaft 128 extends upwardly through an aperture 134 through upper cover 68 of enclosure 64 and fixedly connects to a second knife arm 76, again via a splined connection or the like.

In operation, in the same manner as for drive 62A, rotation of second input element 110 of drive 62B will cause second eccentric element 114 to orbit eccentrically along epicyclical path 118. Second drive arm 120, because it has a fixed length and is attached at one end to second eccentric element 114 and at the other end to pivot arm 126, can only move generally longitudinally, with first end 122 also orbiting along path 118 about rotational axis 112 while also rotating about eccentric axis 116. This, in combination with the ability of pivot arm 126 and pivot shaft 128 of element 130 to only pivot about pivotal axis 132, results in limited pivotal movement of second end 124 of drive arm 120 and pivot arm 126 along an arcuate path 136 about axis 132. Because the second knife arm 76 is fixedly connected to the upper end of pivot shaft 128, it will be similarly limited in movement.

Referring particularly to FIG. 13, epicyclical orbital path 118 of eccentric element 114, eccentric axis 116 and first end 122 of drive arm 120 about rotational axis 112 of input element 110 is shown. Also shown is limited arcuate path 136 of second end 124 of drive arm 120 and pivot arm 126 of pivot element 130 about pivot axis 132, and the resulting arcuate path 136A of knife arm 76 about axis 132. The points X, Y and Z represent the eccentric movements of first end 122 of the drive arm along the epicyclic path 118, and the translated pivotal movements of second end 124 of the drive arm, pivot element 130 and knife arm 76 along arcuate path 136, resulting from rotation of input element 110 about rotational axis 112, as denoted by arrow R. This will result in the attached knife assembly being reciprocatingly moved in the same manner as described above.

It is desired to reciprocatingly move the two knife assemblies 58 simultaneously in opposite sideward directions. To achieve this, first and second drives 62A and 62B are preferably operated in opposite direction, in timed relation. This is preferably accomplished by jointly driving the drives in opposite rotational directions. In the preferred configuration shown, first and second input elements 82 and 110 are connected together via enmeshed gears 138 and 140 which extend therearound, respectively. Alternatively, input elements 82 and 110 could be connected together by a cogged belt, a timing shaft, or the like, and the eccentric axes 88 and 116 offset to provide opposite directional movements of drive arms 92 and 120.

To rotate input elements 82 and 110, a rotatable power source or input 142 is provided, which is preferably an electric or fluid motor, connected in driving relation to one of the input elements 82 or 110 via a bevel gear arrangement 144 or the like, although power input 142 is contemplated to also represent a shaft, belt, or chain drive, as desired. Here, power input 142 is mounted to housing 64 at an acute angle to the forward direction. Also, it can be observed that input elements 82 and 110 are offset in the fore and aft direction. These enable accommodating power input 142 in a manner to provide a shorter overall fore and aft extent of the drives.

As a feature of the invention, to provide a relatively thin, flat overall package, input elements 82 and 110, eccentric elements 86 and 114, and drive arms 92 and 120 of drives 62A and 62B are each relatively flat, and the eccentric elements and drive arms are substantially vertically coextensive, to provide vertical compactness, such that drives 62A and 62B are adapted to be unobtrusively positioned below or in the front region of floor 28 of a header, such as header 22, to allow relatively unhindered plant material flow thereover. In this regard, input elements 82 and 110 are each preferably disk or platter shaped elements supported for rotation about axes 84 and 112, respectively by suitable bearings 146, the inner races of which are connected to enclosure 64 by threaded fasteners 148 which serve as mounting shafts. This configuration provides input elements 82 and 110 sufficient mass to serve as flywheels for the drives. Also, input elements 82 and 110 overlap portions drive arms 120 and 92, respectively, to facilitate fore and aft compactness.

Eccentric elements 86 and 114 are fixedly connected to the respective input elements 82 and 110 for rotation therewith via keyed shafts 150. Drive arms 92 and 120 are mounted about the respective keyed shafts 150 via bearings 152 for rotation thereabout, the eccentric elements and drive arms being held vertically together by threaded fasteners 154. The opposite ends of arms 92 and 120 connect to pivot arms 98 and 126 via clevis joints including bearings 156 to allow relative rotation or pivoting action. Pivot shafts 100 and 128 are supported for rotation in apertures 106 and 134, respectively, by bearings 158, and strap bearings 160 retained by fasteners 162. An upper seal 164 seals the apertures from the elements. Upper and lower covers 68 and 70 are fastened together by fasteners 166 at spaced locations therearound. Power input 142 is also attached with fasteners 166. The splined portions of knife arms 76 and upper ends of pivot shafts 100 and 128, respectively, are held together by fasteners 168, in a clamping action.

It can be observed that drive arms 92 and 120 are several times longer than the diameters of epicyclical paths 90 and 118 of the first or driven ends of the drive arms, here, on the order of at least about 4 times longer. The result of this will be pivoting movements of the drive arms in a manner such that the fore and aft movements of the first ends of the drive arms as they follow their epicyclical paths about the rotational axes of the input members will be relatively large, but will translate into only small fore and aft movements of the second ends and the pivot arms about the pivotal axes. The relatively long drive arms are advantageous, as they translate the eccentric rotational motion into close to a sinusoidal motion of the knives, which is desired for smoothness and cutting ability. The side to side movements of the second ends and pivot arms will be relatively long, corresponding to the diameters of the epicyclical paths. As another advantage, fore and aft forces, denoted by arrows FFA in FIG. 13, exerted against the pivot arms will be effectively minimal, while the sideward forces, denoted by arrows FS, will be maximized. These forces FS are also transmitted substantially longitudinally along the drive arms, and the drive arms act to push and pull longitudinally against pivot arms 98 and 126, which, as another advantage, make the drives robust and strong. As still another advantage, because the two drives are oppositely moving, external forces and resulting vibrations generated by the drives in both the sideward and fore and aft directions, are largely canceled. As another advantage, the configuration of drives 62A and 62B, and packaging in a single enclosure 64, allows pivot shafts 100 and 128, and also the pivotal connections between the drive arms and pivot arms, to be of relatively large diameter, so as to be robust and strong. Here, it should be noted again that although the drive arms are depicted herein and arranged in crossing fashion, they can alternatively extend in opposite sideward directions, away from the other drive, or in more of a fore and aft extending orientation. Still further, although the drives described and depicted have the input elements above the drive arms, it should be understood that this is non-limiting and that the vertical arrangement of the parts can be reversed or rearranged if desired or required for a particular application.

As yet another advantage, it can be observed that the sickle drive, including the enclosure and rotatable power source or input, can have an overall vertical extent that facilitates placement in or below the floor of a header of a plant cutting machine, such that only the knife arms protrude upwardly from the floor. In this regard, it can be observed that power input 142 is no greater in height than the enclosure 64, and is located directly behind it, to facilitate the incorporation of the drives in or under the floor of the header, which is an important advantage of the invention. Alternatively though, it should be understood that it is contemplated according to the invention that more or less of the apparatus can be located above or below the floor of the header, as desired or required.

In light of all the foregoing, it should thus be apparent to those skilled in the art that there has been shown and described a low profile sickle drive. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A sickle drive for a plant cutting machine comprising:
a first sickle knife assembly supported for side to side reciprocating movement along a forward end of the machine,
a rotary power input for driving the first sickle knife assembly,
a rotatable first input element for rotation about a generally upstanding first rotational axis by the rotary power input,
a rotatable second input element adjacent to the first input element for rotation about a generally upstanding second rotational axis by the rotary power input,
a first eccentric element in connection with the first input element for rotation thereby in eccentric relation to the first rotational axis about a generally upstanding first eccentric axis laterally offset relative to the first rotational axis,
a second eccentric element in connection with the second input element for rotation thereby in eccentric relation to the second rotational axis about a generally upstanding second eccentric axis laterally offset relative to the second rotational axis,
a first drive arm having a first end and a second end opposite the first end, the first end being connected to the first eccentric element for rotation about the first eccentric axis and eccentric rotation about the first rotational axis, the first drive arm extending in a first direction from the first end to the second end, the second end pivotally connecting eccentrically to a first pivot element supported for rotation about a generally upstanding first pivotal axis, such that the first pivot element will be pivoted about the first pivotal axis by the rotation of the first input element about the first rotational axis, and the first pivot element being configured for connection to the first sickle knife assembly, such that the first sickle knife assembly will be reciprocatingly moved relative to the drive by the pivoting of the first pivot element, and a second drive arm having a first end and a second end opposite the first end, the first end of the second drive arm being connected to the second eccentric element for rotation about the second eccentric axis and eccentric rotation about the second rotational axis, the second drive arm extending in a second direction from the first end thereof to the second end thereof, the second end of the second drive arm pivotally connecting eccentrically to a second pivot element supported for rotation about a generally upstanding second pivotal axis, such that the second pivot element will be pivoted about the second pivotal axis by the rotation of the second input element about the second rotational axis, and the second pivot element being configured for connection to a second sickle knife assembly, such that the second sickle knife assembly will be reciprocatingly moved relative to the drive by the pivoting of the second pivot element, wherein the first drive arm extends sidewardly of and generally forwardly of and across the second input element, and the second drive arm extends sidewardly of and generally rearwardly of and across the first input element.

2. The sickle drive of claim 1, wherein the first input element and the second input element are connected together for joint rotation in opposite rotational directions, for reciprocatingly moving the first and second sickle knife assemblies simultaneously in opposite sideward directions.

3. The sickle drive of claim 1, wherein the rotatable power input is connected in rotatably driving relation to the first input element and the second input element.

4. The sickle drive of claim 3, wherein the power input comprises a motor.

5. The sickle drive of claim 4, wherein the motor is a fluid motor.

6. The sickle drive of claim 4, wherein the motor is an electric motor.

7. The sickle drive of claim 4, wherein the motor is oriented at an acute angle to a forward direction.

8. A sickle drive comprising;

an enclosure including a generally flat upper cover having a forward end disposed just rearwardly of a sidewardly extending sickle of a header of an agricultural plant cutting machine, and a lower cover which tapers or curves upwardly from a lowermost rear end toward a forward end thereof which connects with the forward end of the upper cover defining a cavity therebetween;

an epicyclic drive mechanism including a rotatable first input element supported in the cavity for rotation about a generally upstanding first rotational axis, a first eccentric element supported in the cavity in connection with the first input element for rotation thereby along a first epicyclic orbit about the first rotational axis, the first eccentric element having a generally upstanding first eccentric axis laterally offset relative to the first rotational axis, a first drive arm disposed in the cavity and having a first end connected to the eccentric element for rotation about the first eccentric axis and eccentric rotation with the eccentric element about the first rotational axis, the first drive arm extending in a first sideward direction to a second end pivotally connected to a pivot arm of a pivot element eccentric about a shaft of the pivot element supported for rotation about a generally upstanding first pivotal axis therethrough extending upwardly through an aperture in the upper cover, such that the shaft will be pivoted about the first pivotal axis by the rotation of the first end of the drive arm;

a second epicyclic drive mechanism including a rotatable second input element supported in the cavity for rotation about a generally upstanding second rotational axis, a second eccentric element supported in the cavity in connection with the second input element for rotation thereby along a second epicyclic orbit about the second rotational axis, the second eccentric element having a generally upstanding second eccentric axis laterally offset to the second rotational axis, a second drive arm disposed in the cavity and having a first end connected to the second eccentric element for rotation about the second eccentric axis and eccentric rotation about the second rotational axis, the second drive arm extending in a second sideward direction opposite the first sideward direction to a second end pivotally connected to a second pivot arm of a second pivot element eccentric about a shaft of the second pivot element supported for rotation about a generally upstanding second pivotal axis therethrough extending upwardly through an aperture in the upper cover, such that the second shaft will be pivoted about the second pivotal axis by the rotation of the first end of the second drive arm, and a second knife arm mounted on the second shaft above the upper cover of the enclosure and connecting to a second knife assembly of the sickle, for reciprocatingly moving the second knife assembly sidewardly relative to the enclosure; and a first knife arm mounted on the shaft of the pivot element above the upper cover of the enclosure and connecting to a first knife assembly of the sickle, for reciprocatingly moving the first knife assembly sidewardly relative to the enclosure, wherein the first drive arm extends sidewardly, across and forwardly of the second input element, and the second drive arm extends sidewardly, across and rearwardly of the first input element.

9. The sickle drive of claim 8, wherein the first input element and the second input element are connected together for joint rotation in opposite rotational directions, for reciprocatingly moving the first and second sickle knife assemblies sidewardly simultaneously in opposite directions, such that sideward forces generated by the movements of the knife assemblies will substantially cancel each other.

10. The sickle drive of claim 8, further comprising a rotatable power input connected in rotatably driving relation to one of the first input element and the second input element.

11. The sickle drive of claim 10, wherein the power input comprises a motor.

12. The sickle drive of claim 11, wherein the motor is a fluid motor.

13. The sickle drive of claim 11, wherein the motor is an electric motor.

14. The sickle drive of claim 11, wherein the motor is oriented at an acute angle to a forward direction.

15. The sickle drive of claim 8, wherein the first drive arm is elongate and is configured and positioned to push and pull longitudinally against the pivot arm when the first end is rotated eccentrically about the first rotational axis.

16. The sickle drive of claim 8, wherein the enclosure is shaped such that a forward lower portion thereof tapers or curves upwardly toward the forward end of the upper cover.

17. The sickle drive of claim 8, further comprising a rotatable power input which is about vertically coextensive with the enclosure.

18. A header for a plant cutting machine comprising:
a generally flat cover or floor having a forward end and bounding and defining an upper region of a generally flat cavity rearwardly of a forward end of the machine; and
a sickle drive disposed below the generally flat cover or floor, the sickle drive including:
a first sickle knife assembly supported for side to side reciprocating movement along the forward end of the machine,
a rotary power input for driving the first sickle knife assembly
a rotatable first input element supported in the cavity for rotation about a generally upstanding first rotational axis by the rotary power input,
a rotatable second input element supported in the cavity adjacent to the first input element for rotation about a generally upstanding second rotational axis by the rotary power input,
a first eccentric element in connection with the first input element for rotation thereby in eccentric relation to the first rotational axis about a generally upstanding first eccentric axis laterally offset relative to the first rotational axis,
a second eccentric element in connection with the second input element for rotation thereby in eccentric relation to the second rotational axis about a generally upstanding second eccentric axis laterally offset relative to the second rotational axis,
a first drive arm having a first end and a second end opposite the first end, the first end being connected to the first eccentric element for rotation about the first eccentric axis and eccentric rotation about the first rotational axis, the first drive arm extending in a first direction from the first end to the second end, the second end pivotally connecting eccentrically to a first pivot element supported for rotation about a generally upstanding first pivotal axis, such that the first pivot element will be pivoted about the first pivotal axis by the rotation of the first input element about the first rotational axis, and the first pivot element being configured for connection to the first sickle knife assembly, such that the first sickle knife assembly will be reciprocatingly moved relative to the drive by the pivoting of the first pivot element, and a second drive arm having a first end and a second end opposite the first end, the first end of the second drive arm being connected to the second eccentric element for rotation about the second eccentric axis and eccentric rotation about the second rotational axis, the second drive arm extending in a second direction from the first end thereof to the second end thereof, the second end of the second drive arm pivotally connecting eccentrically to a second pivot element supported for rotation about a generally upstanding second pivotal axis, such that the second pivot element will be pivoted about the second pivotal axis by the rotation of the second input element about the second rotational axis, and the second pivot element being configured for connection to a second sickle knife assembly, such that the second sickle knife assembly will be reciprocatingly moved relative to the drive by the pivoting of the second pivot element, wherein the first drive arm extends sidewardly within a forward portion of the cavity generally forwardly of and across the second input element, and the second drive arm extends sidewardly within a rear portion of the cavity generally rearwardly of and across the first input element.

19. The header of claim 18, wherein the sickle drive is disposed entirely beneath the floor.

20. The header of claim 19, wherein the sickle drive is disposed between opposite side ends of the header.

* * * * *